United States Patent
Yamashita

[11] 3,972,594
[45] Aug. 3, 1976

[54] RETROFOCUS-TYPE WIDE-ANGLE PHOTOGRAPHIC LENS SYSTEM

[75] Inventor: Nobuo Yamashita, Tama, Japan

[73] Assignee: Olympus Optical Co., Ltd., Tokyo, Japan

[22] Filed: Mar. 19, 1974

[21] Appl. No.: 452,669

[30] Foreign Application Priority Data
Mar. 20, 1973  Japan.............................. 48-32214

[52] U.S. Cl. .............................................. 350/214
[51] Int. Cl.² ............................................. G02B 9/00
[58] Field of Search ................................... 350/214

[56] References Cited
UNITED STATES PATENTS

| | | | |
|---|---|---|---|
| 3,736,049 | 5/1973 | Shimizu | 350/214 |
| 3,748,021 | 7/1973 | Tajima | 350/214 |
| 3,748,022 | 7/1973 | Tajima | 350/214 |

*Primary Examiner*—John K. Corbin
*Assistant Examiner*—Conrad Clark
*Attorney, Agent, or Firm*—Cushman, Darby & Cushman

[57] ABSTRACT

A retrofocus-type wide-angle photographic lens system having a predetermined airspace in said lens system and arranged to be focused for close-up photographing and to prevent aggravation of aberrations by moving a front lens group positioned on the object side of said airspace toward a rear lens group positioned on the image side of said airspace at the same time as advancing the lens system as a whole.

1 Claim, 7 Drawing Figures

SPHERICAL ABERRATION

ASTIGMATISM

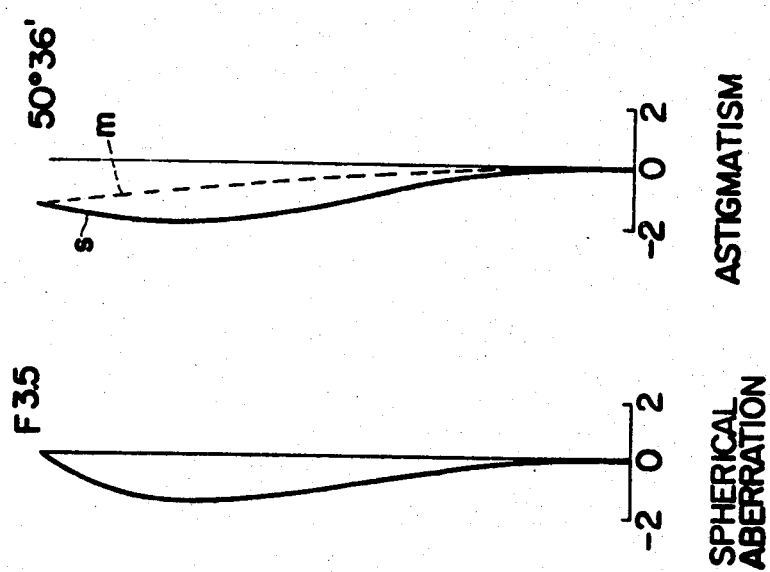
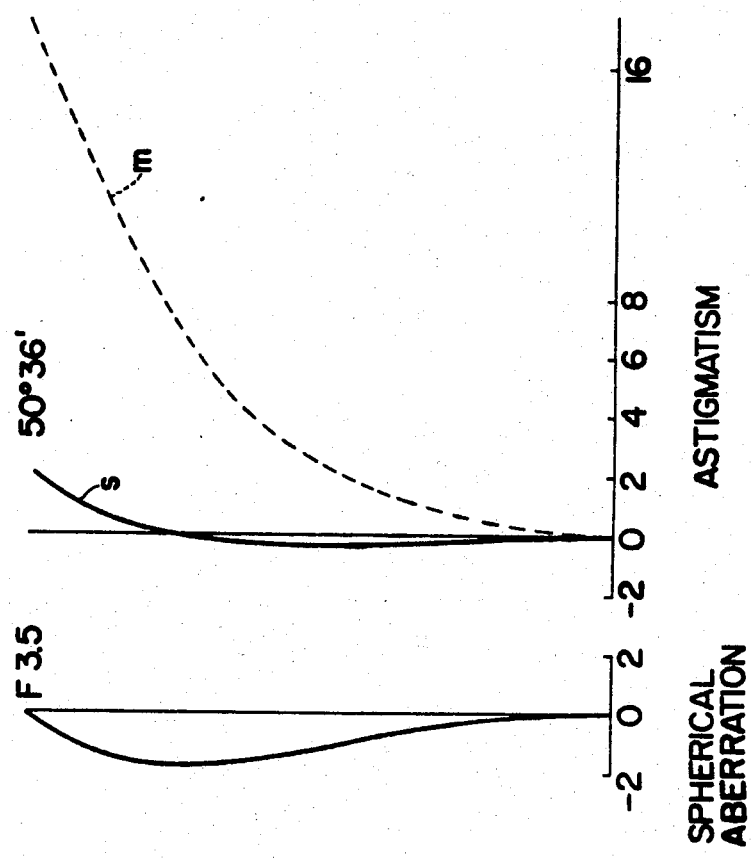

RETROFOCUS-TYPE WIDE-ANGLE PHOTOGRAPHIC LENS SYSTEM

BACKGROUND OF THE INVENTION

1. Field of the Invention

The present invention relates to a photographic lens system and, more particularly, to a retrofocus-type wide-angle photographic lens system arranged to correct aberrations which become unfavourable when focusing on an object at a short distance.

2. Description of the Prior Art

As wide-angle photographic lens systems, retrofocus-type wide-angle lens systems having a negative lens group as a front lens group and a positive lens group as a rear lens group are widely used because of reasons that the back focal length can be made long, an flat image can be obtained over a wide field angle, and so forth. Due to the fact, however, that photographic lens systems are generally designed so that aberrations can be favourably corrected for an object at an infinite distance, aberrations become considerably unfavourable from the center of the field toward the marginal portion when the above-mentioned retrofocus-type lens system is focused on an object at a short distance by advancing the lens system as a whole in the same way as the case of focusing in general. In the above case, there is a tendency as described below when aberrations become unfavourable. That is, especially sagittal astigmatism is over-corrected, meridional astigmatism is remarkably over-corrected and spherical aberration is under-corrected. As correcting means for unfavourable aberrations which occur when the retrofocus-type lens system having the above-mentioned characteristics is focused on an object at a short distance, the following methods are known. One method is to divide the lens system into two groups and to focus by advancing the lens system as a whole by reducing the airspace between said two lens groups. Another method is to focus by moving a pre-determined lens in the lens system at the same time when the lens system as a whole is advanced. However, those lens systems for which the above-mentioned correcting means are adopted have disadvantages that the construction of the focusing mechanism becomes very complicated compared with the focusing mechanism of general lens systems and the outer diameter of the lens mount becomes large because said lens systems require both of the moving mechanism for advancing the lens system as a whole and mechanism for moving a part of lenses in the lens system cooperating with the former moving mechanism for advancing the lens system as a whole.

SUMMARY OF THE INVENTION

It is, therefore, a principal object of the present invention to provide a retrofocus-type wide-angle photographic lens system having a pre-determined airspace in said lens system, comprising a front and rear lens groups divided by said airspace and arranged to be focused for closeup photographing and to correct aberrations by moving said front lens group toward said rear lens group at the same time as advancing the lens system as a whole, said retrofocus-type wide-angle photographic lens system being arranged to favourably correct aberrations at the time of close-up photographing to such conditions close to those in case of photographing an object at an infinite distance over the whole field angle.

Considering the fact that, for retrofocus-type lens systems, meridional astigmatism is largely aggravated when the lens system is focused on an object at a short distance, the lens system according to the present invention is arranged to decide said airspaces between lenses as such airspace where spherical aberration and sagittal astigmatism of the lens system when said airspaces between lenses is varied are scarecely aggravated compared with those aberrations for an object at an infinite distance and, moreover, the above-mentioned aggravation of meridional astigmatism can be corrected very favourably.

The amount of aggravation of meridional astigmatism at the marginal portion becomes as follows. In case of the retrofocus-type lens system, there is a tendency that meridional astigmatism is overcorrected as described in the above. Therefore, when meridional astigmatism in close-up photographing is represented by reference symbol $(AS_M)_{CL}$ and meridional astigmatism when photographing an object at an infinite distance is represented by reference symbol $(AS_M)_\infty OO$, the above-mentioned amount of aggravation of meridional astigmatism is expressed as follows.

$$[(AS_M)_{CL} - (AS_M)_\infty]$$

Besides, in the lens system according to the present invention, the front lens group is moved toward the rear lens group corresponding to advancing of the lens system as a whole. Therefore, said airspace is varied to become smaller and, consequently, the amount of change of said airspace becomes a negative value. Provided that the amount of change of aberration when said airspace is changed by a unit amount is called a coefficient of correction, the lens system according to the present invention is arranged by deciding said airspace as such airspace where $[(AS_M)_{CL} - (AS_M)_\infty]$ and its coefficient of correction have the same plus or minus sign because coefficients of correction for spherical aberration and sagittal astigmatism are small and the coefficient of correction for meridional astigmatism is large.

Further, it is desirable to decide said airspace as such airspace where the quotient when $[(AS_M)_{CL} - (AS_M)_\infty]$ is divided by the amount of change of the airspace is approximately equal to the above-mentioned coefficient of correction of meridional astigmatism.

Besides, it is desirable that said front lens group comprises at least one each of convex and concave lenses out of lens components in the diverging lens group in the retrofocus-type lens system. The reason why a lens group including at least one convex lens out of the diverging lens group is arranged to be moved is to prevent fluctuation of distortion of the lens system as a whole when said lens group is moved. For example, aberrations in close-up photographing can be corrected by moving only one concave lens. In that case, however, distortion of said lens itself which is to be moved is not corrected. Therefore, when said lens is moved, distortion of the lens system as a whole fluctuates. On the contrary, when the lens group to be moved includes a convex lens, it is possible to correct distortion of the front lens group itself which is to be moved together with the concave lens. Consequently, distortion of the lens system as a whole is not fluctuated by said movement. Especially, when the front lens group is arranged so that the relation $|f_{Mov}/f| \geq 1$ is satisfied when the total focal length of the front lens group to be moved is represented by reference symbol $f_{Mov}$ and the focal length of the lens system as a whole is represented by reference symbol $f$, meridional astigmatism can be corrected satisfactorily and at the same time spherical aberration and sagittal astigmatism can be corrected extremely favourably.

Besides, it is more desirable that lens surfaces just in front and rear of the airspace to be varied are arranged as convex surfaces toward the object. Moreover, when the value of said airspace when photographing an object at an infinite distance is represented by reference symbol $D_\infty$ and the distance between the position of the entrance pupil of the rear lens group and the first surface of lenses in the rear lens group (the surface nearest the object) is represented by reference symbol $D_R$, it is desirable that $D_\infty + D_R$ becomes a value larger than the absolute value $|r_F|$ of radius of curvature of the final surface of lenses in the front lens group (the surface nearest the image). Moreover, it is most desirable that $D_\infty + D_R$ becomes a value slightly larger than $r_F$. When the radius of curvature of the final surface of lenses in the front lens group and other values are decided as above, the angle between the light coming out from the final surface of lenses in the front lens group and normal line of said surface becomes approximately equal to the angle between the light incident to the first surface of lenses in the rear lens group and normal line of said first surface. Therefore, when said airspace is varied, influence on aberrations becomes very small.

BRIEF DESCRIPTION OF THE DRAWINGS

FIGS. 2A, 2B, 3A, 3B, 4A and 4B respectively show graphs illustrating conditions of aberrations of said embodiment.

DETAILED DESCRIPTION OF THE PREFERRED EMBODIMENT

Figure 1:
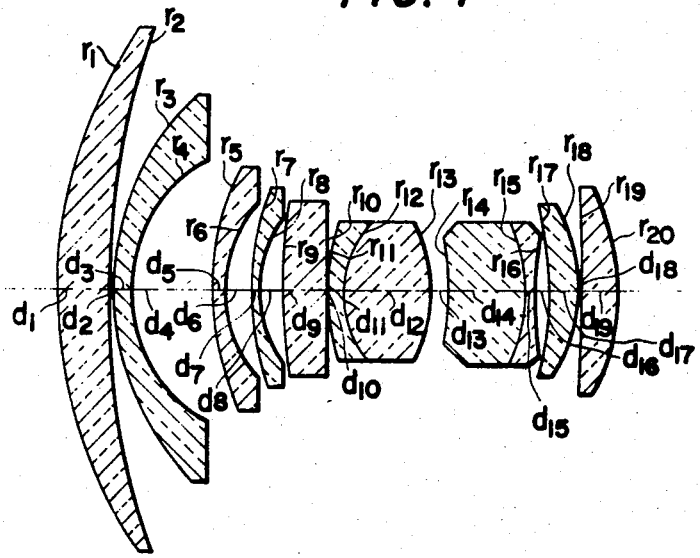
FIG. 1 shows a sectional view of an embodiment of the retrofocus-type wide-angle photographic lens system according to the present invention.

A preferred embodiment of the lens system according to the present invention is a lens system arranged as shown in FIG. 1 and its numerical data are as shown below.

Embodiment
$f = 100$, $f_{Mov} = 2.53f$

| | | | |
|---|---|---|---|
| $r_1 = 193.18$ | | | |
| | $d_1 = 24.59$ | $n_1 = 1.6779$ | $\nu_1 = 55.33$ |
| $r_2 = 352.41$ | | | |
| | $d_2 = 0.55$ | | |
| $r_3 = 122.79$ | | | |
| | $d_3 = 8.20$ | $n_2 = 1.7859$ | $\nu_2 = 44.24$ |
| $r_{0.88} = 61.26$ | | | |
| | $d_4 = $ Variable | | |
| $r_5 = 110.06$ | | | |
| | $d_5 = 8.20$ | $n_3 = 1.7859$ | $\nu_3 = 44.24$ |
| $r_6 = 59.59$ | | | |
| | $d_6 = 10.93$ | | |
| $r_7 = 110.79$ | | | |
| | $d_7 = 5.46$ | $n_4 = 1.7859$ | $\nu_4 = 44.24$ |
| $r_8 = 58.86$ | | | |
| | $d_8 = 10.93$ | | |
| $r_9 = 164.65$ | | | |
| | $d_9 = 19.60$ | $n_5 = 1.57501$ | $\nu_5 = 41.49$ |
| $r_{10} = -932.08$ | | | |
| | $d_{10} = 0.82$ | | |
| $r_{11} = 172.18$ | | | |
| | $d_{11} = 5.46$ | $n_6 = 1.6968$ | $\nu_6 = 55.62$ |
| $r_{12} = 47.67$ | | | |
| | $d_{12} = 38.40$ | $n_7 = 1.5927$ | $\nu_7 = 35.54$ |
| $r_{13} = -76.78$ | | | |

-continued

| Embodiment | | | |
|---|---|---|---|
| | $d_{13} = 8.74$ | | |
| $r_{14} = -140.51$ | | | |
| | $d_{14} = 35.78$ | $n_8 = 1.8044$ | $\nu_8 = 39.62$ |
| $r_{15} = -71.22$ | | | |
| | $d_{15} = 5.46$ | $n_9 = 1.84666$ | $\nu_9 = 23.88$ |
| $r_{16} = 340.15$ | | | |
| | $d_{16} = 4.37$ | | |
| $r_{17} = -266.73$ | | | |
| | $d_{17} = 14.59$ | $n_{10} = 1.618$ | $\nu_{10} = 63.38$ |
| $r_{18} = -76.40$ | | | |
| | $d_{18} = 0.82$ | | |
| $r_{19} = -547.36$ | | | |
| | $d_{19} = 15.57$ | $n_{11} = 1.618$ | $\nu_{11} = 63.38$ |
| $r_{20} = -111.26$ | | | |

In the above, reference symbols $r_1$ through $r_{20}$ respectively represent radii of curvature of respective surfaces of lenses, reference symbols $d_1$ through $d_9$ respectively 19 thicknesses of respective lenses and airspaces between lenses, reference symbols $n_1$ through $n_{11}$ respectively represent refractive indexes for d-line of respective lenses, and reference symbols $\nu_1$ through $\nu_{11}$ respectively represent Abbe's numbers of respective lenses.

Figure 2A:
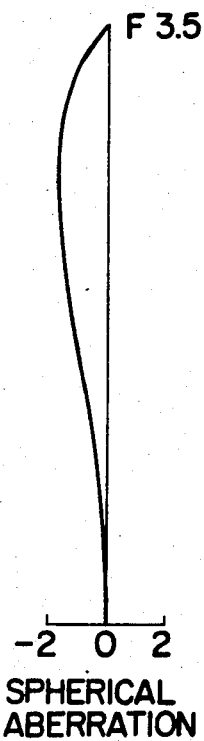
Figure 2B:
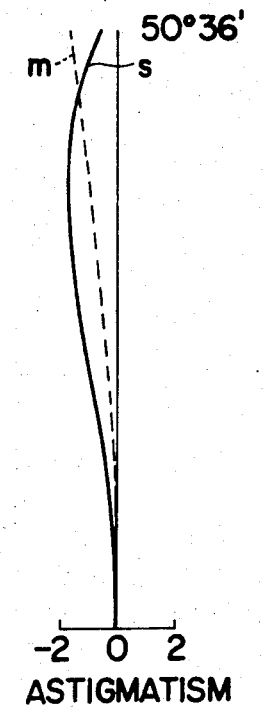

The above embodiment is arranged by deciding the airspace $d_4$ as the above-mentioned airspace to be changed. When the distance to the object is infinitely large, said airspace is $d_4 = 35.08$. When the distance to the object is 1 m ($\beta = -0.095$), said airspace is $d_4 = 24.77$ and the advancing amount of the lens system as a whole at that time is 11.59. Out of aberration curves of this embodiment, FIGS. 2A and 2B show curves when the distance to the object is infinitely large, FIGS. 3A and 3B shows curves when the distance to the object is 1 m and the lens system as a whole is advanced, and FIGS. 4A and 4B show curves when the distance to the object is also 1 m and the front lens group is moved toward the rear lens group at the same time as the lens system as a whole is advanced.

As it is evident from the above embodiment and its aberration curves, the lens system according to the present invention is free from any aggravation of spherical aberration or sagittal astigmatism. Besides, meridional astigmatism is corrected very favourably when the front lens group is moved toward the rear lens group as shown in FIG. 4B compared with the case when only the lens system as a whole is advanced which is shown in FIG. 3B. Besides, when FIGS. 2A and 2B are compared with FIGS. 4A and 4B, it is evident that aberration curves in both cases show very similar tendency. This means that, for the lens system according to the present invention, aberrations in close-up photographing are favourably corrected to the degree same as the case of photographing an object at an infinite distance, at the zonal portion of the field as well as marginal portions of the field. Generally, in cases of conventional lens systems arranged to correct aberrations in close-up photographing by floating a predetermined lens, aberrations at the zonal portion of the field are not satisfactorily corrected in most cases even when aberrations at the marginal portion are corrected favourably. In case of the lens system according to the present invention, however, aberrations are corrected quite favourably over the whole field angle as described in the above.

I claim:

1. A retrofocus-type wide-angle photographic lens system comprising nine lens components wherein a first lens component being a positive meniscus lens, a second, third and fourth lens components respectively being negative meniscus lenses, a fifth lens component being a positive lens, a sixth lens component being a cemented positive doublet lens, a seventh lens component being a cemented negative doublet lens, and an eighth and ninth lens components respectively being positive lenses, said retrofocus-type wide-angle photographic lens system having numerical data as given below and arranged to move a front lens group comprising said first and second lens components toward a rear lens group comprising said third through ninth lens components at the same time as the lens system as a whole is advanced, Numerical data
$f = 100$, $f_{Mov} = 2.53f$
$r_1 = 193.18$
$d_1 = 24.59$, $n_1 = 1.6779$, $\nu_1 = 55.33$
$r_2 = 352.41$
$d_2 = 0.55$
$r_3 = 122.79$
$d_3 = 8.20$, $n_2 = 1.7859$, $\nu_2 = 44.24$
$r_4 = 61.26$
$d_4 = $ Variable
$r_5 = 110.06$
$d_5 = 8.20$, $n_3 = 1.7859$, $\nu_3 = 44.24$
$r_6 = 59.59$
$d_6 = 10.93$
$r_7 = 110.79$
$d_7 = 5.46$, $n_4 = 1.7859$, $\nu_4 = 44.24$
$r_8 = 58.86$
$d_8 = 10.93$ -continued Numerical data
$r_9 = 164.65$
$d_9 = 19.60$, $n_5 = 1.57501$, $\nu_5 = 41.49$
$r_{10} = -932.08$
$d_{10} = 0.82$
$r_{11} = 172.18$
$d_{11} = 5.46$, $n_6 = 1.6968$, $\nu_6 = 55.62$
$r_{12} = 47.67$
$d_{12} = 38.40$, $n_7 = 1.5927$, $\nu_7 = 35.54$
$r_{13} = -76.78$
$d_{13} = 8.74$
$r_{14} = -140.51$
$d_{14} = 35.78$, $n_8 = 1.8044$, $\nu_8 = 39.62$
$r_{15} = -71.22$
$d_{15} = 5.46$, $n_9 = 1.84666$, $\nu_9 = 23.88$
$r_{16} = 340.15$
$d_{16} = 4.37$
$r_{17} = -266.73$
$d_{17} = 14.59$, $n_{10} = 1.618$, $\nu_{10} = 63.38$
$r_{18} = -76.40$
$d_{18} = 0.82$
$r_{19} = -547.36$
$d_{19} = 15.57$, $n_{11} = 1.618$, $\nu_{11} = 63.38$
$r_{20} = -111.26$ in the above, reference symbols $r_1$ through $r_{20}$ respectively represent radii of curvature of respective surfaces of lenses, reference symbols $d_1$ through $d_{19}$ respectively represent thicknesses of respective lenses and airspaces between lenses, reference symbols $n_1$ through $n_{11}$ respectively represent refractive indexes for d-line of respective lenses, and reference symbols $\nu_1$ through $\nu_{11}$ respectively represent Abbe's numbers of respective lenses.

* * * * *